United States Patent [19]

MacMullen

[11] Patent Number: 5,900,280
[45] Date of Patent: May 4, 1999

[54] TREATING EARTHENWARE BODIES

[76] Inventor: Paul Neil MacMullen, 15 Tennyson Road, Weymouth, United Kingdom

[21] Appl. No.: 08/446,722

[22] PCT Filed: Oct. 15, 1993

[86] PCT No.: PCT/GB93/02132

§ 371 Date: Aug. 2, 1995

§ 102(e) Date: Aug. 2, 1995

[87] PCT Pub. No.: WO94/08917

PCT Pub. Date: Apr. 28, 1994

[30] Foreign Application Priority Data

Oct. 15, 1992 [GB] United Kingdom .................... 9221642
Oct. 16, 1992 [GB] United Kingdom .................... 9221728
Oct. 28, 1992 [GB] United Kingdom .................... 9222630

[51] Int. Cl.$^6$ ................................. B05D 1/38; B05D 3/02
[52] U.S. Cl. ........................ 427/258; 427/266; 427/269; 427/376.2; 427/379
[58] Field of Search .................................... 427/258, 266, 427/269, 376.2, 379

[56] References Cited

U.S. PATENT DOCUMENTS

| | | | |
|---|---|---|---|
| 3,895,136 | 7/1975 | Makishima et al. | 427/257 |
| 3,904,791 | 9/1975 | Iverson et al. | 427/277 |
| 4,293,599 | 10/1981 | Hori et al. | 427/278 |
| 4,315,790 | 2/1982 | Rattee et al. | 427/148 |

FOREIGN PATENT DOCUMENTS

| | | |
|---|---|---|
| 1192778 | 9/1989 | Japan . |
| 2311348 | 12/1990 | Japan . |
| 1 582924 | 1/1981 | United Kingdom . |

OTHER PUBLICATIONS

Wensley, Doug Pottery A Guide to Advanced Techniques Crowood Press, 1995, pp. 89, 91, 122–123.

*Primary Examiner*—Shrive Beck
*Assistant Examiner*—Bret Chen
*Attorney, Agent, or Firm*—McCormick, Paulding & Huber

[57] ABSTRACT

A method of treating earthenware bodies to enhance resistance to freezing and to assist the application of decals and the like thereto comprises treating the bodies with a liquid medium containing a water-repellent material such as silicone. In a subsequent drying step, the bulk of the liquid medium is removed while leaving the water-repellent material deposited in the pores of the earthenware body. In this way, subsequent entry of water and freezing and cracking is resisted. It has also been discovered that the treatment also enchances the ability of the earthenware surface to receive decals and the like without the need for glazing and an additional firing step.

7 Claims, 2 Drawing Sheets

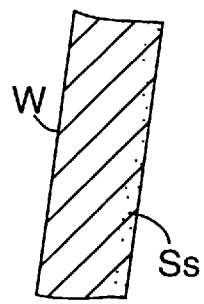 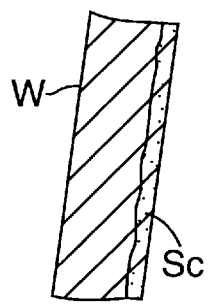 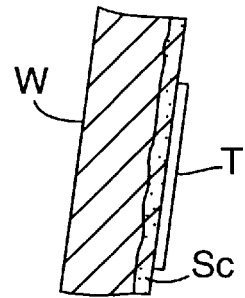 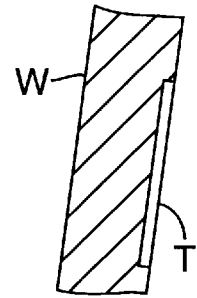
FIG. 5a  FIG. 5b  FIG. 5c  FIG. 5d
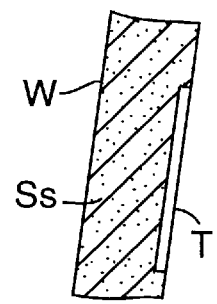
FIG. 5e

TREATING EARTHENWARE BODIES

BACKGROUND OF THE INVENTION

This invention relates to the treatment of the ceramic and other earthenware bodies, and is particularly but not exclusively concerned with the treatment of fired clay bodies in the form of ceramic garden or patio pots. Other applications include hanging pots, wall hangers, house bricks and ceramic roof tiles, or any other ceramic, fired clay or earthenware article.

One particular problem associated with ceramic pots and containers intended for use outdoors eg in gardens, patios and on walls, is the tendency towards damage due to the action of frost. It is a well-known fact that when water is absorbed into the walls of porous earthenware pots, freezing temperatures will case that water to expand and the pots will often crack, laminate, effloresce or simply fracture.

Attempts have been made in the past to obviate this problem by making surfaces of the pot water repellent or waterproof, eg by glazing. If the glaze is applied while there is still some moisture in the earthenware then freezing temperatures will nevertheless have the same detrimental effect on the ware. Further, it has been found that because of the environment in which garden or patio pots are used and located, damage is often suffered by; the glaze, allowing ingress of water or moisture which is acted upon by the freezing temperature so that expensive and attractive pots are damaged and often destroyed.

Some earthenware pots are decorated by decalcomania transfers or by hand painting, the decoration being then fired onto the surface. It is preferred that the surface area of the pot where the transfer or paint is to be applied is smooth and for this reason the surface is sometimes glazed before applying the transfer or other art work. This process involves an additional firing which adds to the cost of the decorated ware.

It is an object of the invention to provide a method of treating ceramic or other earthen ware that does not suffer from some or all of the above disadvantages and which results in a pot which reduces the damage by reason of freezing temperatures acting on the ware, and/or to provide improvements generally.

A further alternative object is to attempt to provide a method of treating earthen ware and the like to enable it to be more receptive to decals or other decoration without the need for glazing the ware before decorating it.

A further alternative object includes attempting to provide ceramic or other earthen ware which does not suffer from the known limitations and faults of ware produced by conventional processes.

SUMMARY OF THE INVENTION

According to the present invention there is provided a process of impregnating a fired earthenware body and a product made by that process, as claimed in the accompanying claims.

In one embodiment, a method of treating a fired earthenware body comprises treating the body with a liquid medium comprising a water-repellent constituent such as silicone, drying the body so as to leave the water-repellent constituent within the pores of the body, whereby resistance to entry of water and subsequent freezing is improved.

In the embodiment, the step of drying the body is preferably carried out at a raised temperature below 200° C., whereby the rate of drying is increased, but degredation of the silicone or other water-repellent material is minimized. In the embodiment, pressure may be applied to cause the water-repellent medium to more thoroughly permeate the porous structure of the earthenware.

In another embodiment, an earthenware body is provided with enhanced ability to receive a decal or transfer or other decorative element by treatment with a liquid medium such as a silicone-containing liquid medium (in the form of a solution in a solvent, or a dispersion or emulsion in water, for example). In this way, it has been found, surprisingly, that the necessity for the provision of a glazed surface for the satisfactory application of decals and the like is avoided. Surprisingly, after treatment with a silicone-containing liquid medium, and subsequent drying, decals can be applied. In a subsequent firing step, in which the temperature is raised above 200° C., the silicone material is removed, while the transfer remains and thus significant advantages are provided over previous techniques in this field.

BRIEF DESCRIPTION OF THE DRAWINGS

FIGS. 5a, 5b, 5c, 5d and 5e are part sections through the wall of a pot during a process for decorating the fired clay pot.

DETAILED DESCRIPTION OF THE PREFERRED EMBODIMENT

Figure 1:
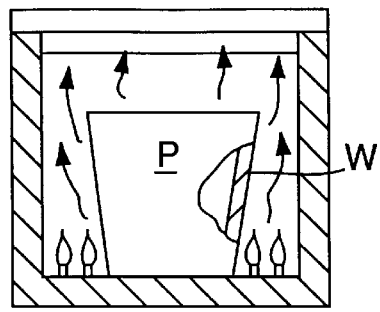
FIG. 1 is a section view through a drying or other treatment oven containing an earthenware pot in part of the processing operation.
Figure 1A:
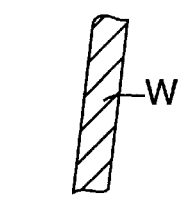
FIG. 1a is an enlarged section of part of the pot seen in FIG. 1.

As seen in FIG. 1 an earthenware pot P, having side walls W is located within a drying oven 2 and any moisture present within the pot is caused to evacuate.

Figure 2:
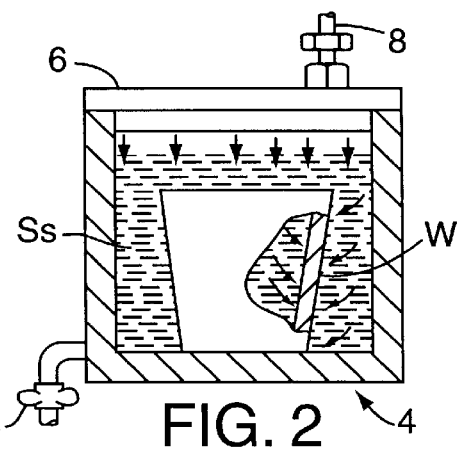
FIG. 2 is a section view of an impregnation tank containing a pot in a further part of the process.

After cooling, the totally dried out pot is then placed within a tank 4 containing a silicone water solution S which then impregnates the pot hydrostatically. To expedite the impregnation process a lid 6 is sealingly fitted over the top of the tank and compressed air is fed through a port 8 to pressurize the tank as seen in FIG. 2. The tank remains in this condition for a pre-determined period of time according to the size and thickness of the pot or pots placed therein, when the earthenware is totally impregnated by the silicone solution $S_S$. If desired, the silicone solution may include any other vehicle besides water, eg a solvent. In this specification, unless otherwise stated, references to a "silicone solution" in water are intended to refer to a solution or dispersion or emulsion of a silicone compound in water, for example an aqueous solution of potassium methyl siliconate.

Figure 2A:
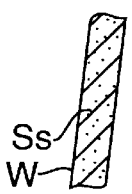
FIG. 2a is an enlarged section view of part of the pot seen in FIG. 2.
Figure 3:
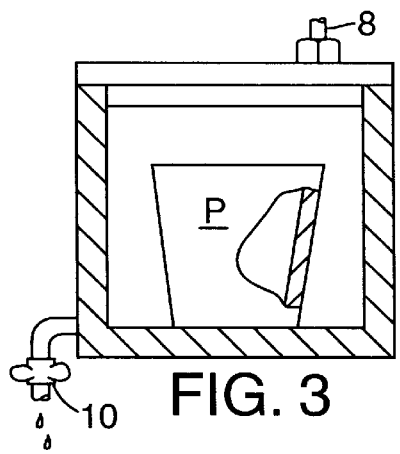
FIG. 3 is a view similar to FIG. 2 in a further part of the process.
Figure 3A:
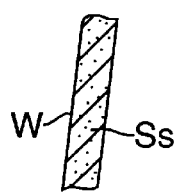
FIG. 3a is an enlarged section view of part of the pot seen in FIG. 3.
Figure 4:
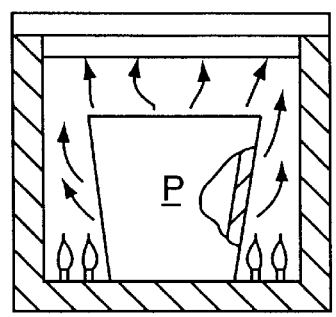
FIG. 4 is a section of a drying apparatus.
Figure 4A:
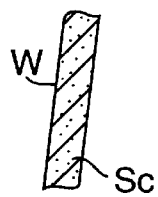
FIG. 4a is an enlarged section view of part of the pot seen in FIG. 4.

The tank is then depressurized and the solution is drained away via a drain cock 10 as seen in FIG. 3. The silicon impregnated wall of the pot is shown in FIGS. 2a and 3a.

The next step in the process is to remove the moisture from the silicone solution $S_S$. To this end, the pot is placed within a kiln 14 and subjected to a temperature of between 100° centigrade and 150° centigrade. This drives the remaining moisture out of the pot in the form of water vapor. Alternatively removal of the moisture content may be effected by subjecting the ware to a vacuum, eg by sealing the ware in a tank and then connecting to a vacuum source or the body may be exposed, after impregnation to a carbon dioxide atmosphere.

The earthenware pot is thus fully impregnated with water resistant silicone crystals $S_S$ as illustrated in FIG. 5a, which is found to be effective in preventing any moisture being absorbed by the first clay pot and therefore is immune from frost damage.

It is frequently desired to decorate earthenware pots by the application of a decal transfer or by hand-painting or spraying.

It is found to be beneficial for the transfer or other decorating medium to be applied over an area of the pot or other ware which has been impregnated by a silicone mixture after which the transfer is "fired on" to the ware in the usual manner. Such a preparatory process enable slight-fast and waterproof colors to be applied resulting in vivid long-life decorations on the earthenware body.

"Fired on" color is also found to provide the effect of fine lines and detail, giving greater definition on waterproofed ceramic bodies than on porous fired clay bodies.

In this process an earthenware pot is dried thoroughly in a drying oven after which the area of the pot to be decorated has applied thereto the silicone based water repellent solution, by painting by brush, by spraying, or by total immersion of the pot in the solution.

The pot with its applied solution is next allowed to thoroughly dry after which the art work or decoration eg decal transfer, brush or spray painting, rubber gelatine or silicone stamping, screen printing, montage or thermoplastics technique is applied in the usual manner. The transfer or other decoration is then "fused on" to the pot by subjecting it to kiln firing at a temperature between 700° C. and 800° C. During this firing, when the temperature has exceeded 200° C. the silicone base burns away without disturbing the transfer, leaving a totally porous pot. Impregnation of the pot with a liquid silicone solution can then be applied as described earlier if so desired.

The above decorating process is illustrated in FIGS. 5a, 5b, 5c, 5d and 5e.

FIG. 5a illustrates part section of the wall of an earthenware pot showing a small section of the pot being impregnated on the outer surface by a brushed on solution $S_S$ of silicon. FIG. 5b illustrates the wall of the pot after it has been subjected to a drying operation whereby the outer surface of the wall comprises an internal "skin" of silicone crystals Sc. FIG. 5c illustrates the application of a transfer T to the outer surface of the wall of the pot and FIG. 5d illustrates the decorative element having been "fused on" into the wall of the pot. FIG. 5e illustrates the final resultant wall of the pot after the silicone solution has been impregnated into the pot and the moisture content of the solution has been evacuated leaving the waterproofing silicone crystals Sc within the clay body.

In a further process a backing of light colored paint or a light colored decal transfer, may be applied to the ware after the initial impregnation of silicone, in order that the colors of the transfer may be more outstanding.

In some circumstances it is beneficial to impregnate the ware with a silicone solution which contains a coloring medium and the ware would then be colors where impregnation takes place. The ware need not be impregnated by colors silicone solution over its entire area, only selected bands or other areas being so treated. One method of effecting this is to impregnate the area where coloring is not required with colorless silicone solution. The coloured silicone solution is then applied by brushing, spraying or immersion, the colorless solution acting as a mask to prevent color passing on to the plain areas.

Although the process of the invention has been described with reference to an earthenware pot, it should be understood that it can be used in the treatment of other fired clay products, eg house bricks, roof tiles, and un-glazed floor tiles.

What is claimed is:

1. A process for making a decorated earthenware body comprising:

a) providing said earthenware body which is porous;

b) impregnating at least a portion of said earthenware body with a silicone based water repellent solution thereby providing an area receptive to the application of a surface decoration thereto;

c) drying said earthenware body below 200° C.;

d) applying said surface decoration to the portion of said earthenware body impregnated with said silicone based water repellent solution; and e) heating said earthenware body to a temperature in excess of 200° C. to remove said silicone based water repellent solution leaving said surface decoration on said earthenware body intact.

2. A process according to claim 1, further comprising the step of applying an underbody or a coating of paint or a decal to an area of said earthenware body where said surface decoration is to be applied.

3. A process according to claim 2, wherein said silicone based water repellent solution comprises potassium methyl siliconate.

4. A process according to claim 1, wherein said temperature is in the range of 600° C. to 1500° C.

5. A process according to claim 1, wherein said silicone based water repellent solution comprises potassium methyl siliconate.

6. A process according to claim 1, wherein said silicone based water repellent solution comprises a coloring medium.

7. A process according to claim 6, further comprising the step of reheating the body to a temperature of less than 200° C.

* * * * *